United States Patent Office 3,246,050
Patented Apr. 12, 1966

3,246,050
METHOD OF REDUCING CARBOXYLIC ACID CONTENT OF RUBBERY POLYMER-STYRENE SOLUTION
Maurice L. Zweigle, Midland, Mich., assignor to The Dow Chemical Company, Midland, Mich., a corporation of Delaware
No Drawing. Filed Dec. 22, 1961, Ser. No. 161,364
5 Claims. (Cl. 260—880)

The present invention concerns an improved process for the production of interpolymers of vinyl aromatic monomers and rubbery polymeric derivatives of aliphatic conjugated diolefins.

The interpolymers concerned in the invention comprise in chemically combined form a major proportion, e.g., 99 to 75 percent by weight, of the vinyl aromatic monomer and a minor proportion, e.g., 1 to 25 percent by weight, of a rubbery polymer of an aliphatic conjugated diolefin having from 4 to 6 carbon atoms in the diolefin moiety. Mass reaction techniques are usually employed to prepare these interpolymers with suitable modifications and controls thereof to suppress overheating in the reaction mass due to the highly exothermic nature of the reaction. Usually, the reaction is carried out at temperatures within the range from about 50° up to about 240 C., preferably, however, never exceeding 175° C. if the reaction is to be continued for a substantial period of time. Illustrative techniques and interpolymers are described in United States Patent 2,606,163.

As initially polymerized, the interpolymers are translucent and nearly white and excellent for use with or without pigments, fillers and other usual additaments as molding compositions. Such compositions, when subjected to heat and plasticizing temperatures and molding pressures, can be formed into accurate dimensioned articles. The prime advantage of such molded articles is their high resistance to impact stress.

In commercial practice, however, fabrication or pressure molding of the above interpolymeric compositions sometimes results in shaped articles evidencing black specks or smears. When this occurs, however, physical inspection of the interpolymeric molding composition does not reveal the existence of any discolorations that would appear as black specks or smears in the ultimately-molded product.

It is a principal object of the present invention to provide an improved process for the production of styrene-rubber interpolymers for utilization as high impact molding compositions. Particularly, it is an object of the invention to provide a method for the production of such interpolymers whereby the occurrence of black specks and smears in ultimately molded products is obviated. Other objects and benefits of the invention will become manifest hereinafter.

It has been discovered that an improved process for the production of vinyl aromatic rubbery interpolymers is provided by utilizing as the rubbery component of the reaction mass, a creamed rubber latex substantially free of organic carboxylic acids and salts thereof or, in another mode of operation, by adding to the polymerization process for such interpolymers, the step of contacting the interpolymer-forming reaction mass with an inert scavenger for free carboxylic acids in a manner so as to provide a reaction mass substantially free of organic carboxylic acids.

The significance of the above discovery becomes more apparent upon a consideration of techniques utilized for the production of the rubber latex and conditions that were discovered to contribute to the formation of the black specks or smears during the molding operation.

Briefly, the production of the rubber-latex utilized in the production of the aforementioned interpolymeric materials essentially involves dispersing a suitable diene monomer charge into an aqueous medium with the aid of an emulsifier and in the presence of other agents for promoting polymerization such as, for example, catalysts and buffers for the control of pH. The monomer charge may include butadiene, 2,3-dimethylbutadiene, chloroprene and mixed systems of butadiene and styrene wherein at least 50 percent of the monomer charge is butadiene; acrylonitrile and butadiene wherein at least about 50 percent of the mixture is butadiene and the like.

Typical emulsification-polymerization batch recipes for common rubbers include from 50 to 85 parts butadiene, 50 to 15 parts styrene, 1 to 5 parts of an emulsifier which is usually a fatty acid soap, 1 to 5 parts of a buffer, .1 to 1 part of a polymerization free radical-producing catalyst and from 100 to 400 parts of water.

A desired recipe is charged to a stirred reactor and the polymerization carried out at a moderate temperature, usually below about 150° C., until a substantial conversion of monomer to polymer is obtained. This is usually accomplished in a period of from 5 to 15 hours. The polymerization reaction is then terminated, unreacted monomer removed from the reaction product by distillation and the latex coagulated in the system by adding an inorganic salt such as sodium chloride and subsequently acidifying with a mineral acid. In addition to promoting coagulation of the latex, acidification releases free carboxylic acids from the soap employed as the emulsifying agent. Thereafter, the latex is thoroughly washed with water but, apparently, due to the relative insolubility of the free organic carboxylic acids in the water as compared to their solubility in the hydrophobic rubbery, coagulum, certain, though seemingly insignificant, amounts of the acid impurity are retained in the rubber.

It has now been discovered that an amount of such organic acids in excess of about 500 parts per million by weight in the rubber latex employed to prepare the above styrene-rubber interpolymers will form interpolymers in which black specks or smears can occur during the molding cycle. It is a further discovery that temperatures and pressures encountered by the interpolymer during the molding cycle and catalytic impurities in the interpolymer such as ferric ion that may be picked up by the interpolymer from process equipment are conditions which contribute to decomposition of the trace amounts of free organic carboxylic acids, or degradation products thereof, normally found in rubber latexes. Such decomposition results in isolated carbonization which is manifest as black specks and smears in the ultimately-molded product.

In one mode of operation, the occurrence of black specks and similar discolorations in the ultimately-molded products of the interpolymers can be obviated by preparing the interpolymers with rubber latexes that have been prepared without the presence of emulsifying agents which are precursors to carboxylic acids. Often this approach will not be desirable since the fatty acid soaps are uniquely efficacious as emulsifiers for the polymerization of the rubber latexes. Thus, as another mode of operation, rubber latexes produced in the presence of the fatty acid soaps are substantially free of residues of carboxylic acids by contacting the latex, in an effective manner, with one or more suitable scavengers for the acids. In practice, the rubber latex is dissolved in the liquid vinyl aromatic monomer with which it is to be interpolymerized. Subsequently, and prior to interpolymerizing the latex and monomer, the solution is contacted with one or more suitable solid, insoluble, scavenger materials. Generally, any solid scavenger material can be utilized which is inert to and insoluble in the interpolymer reaction system and which scavenger forms salts with the carboxylic impurities present in the solution. As will be manifest to those skilled in the art, the scavenger must not itself be, or contain, materials that would catalyze or react with the vinyl aromatic monomers employed. Specific highly effective scavenger materials include anion exchange resins in the hydroxyl form and oxides and hydroxides of metals in Groups I, II and III of the Periodic Table, inclusive of various reactive allotropic forms thereof. The Periodic Table referred to is that in Lange's Handbook of Chemistry, 9th edition, pages 56 and 57. It should be noted that it is essential to the invention that any scavenger material employed be substantially free if iron.

In one manner of carrying out the foregoing operation, removal of the organic carboxylic acids from the rubber-monomer solution is accomplished by slurrying the adsorbent material into the latex-monomer solution and subsequently recovering the adsorbent materials from the solution by filtration. Another method involves percolating the latex-styrene solution through a column packed with the adsorbent material. However, due to the relative inefficiency of the latter technique as a result of the tendency of the column to become plugged, the former slurrying and filtration technique is preferred.

The temperature at which the adsorption operation is carried out is conveniently the ambient temperature but lower temperatures down to about −30° C. and higher temperatures up to as much as 80° C. or more can be employed if desired.

The period of contacting depends upon the amounts of scavenger used, the extent of agitation and the quantity of the organic carboxylic acid impurity to be removed. With an amount of scavenger material having a total capacity of at least about twice the amount of carboxylic impurities to be removed, effective scavenging can be achieved in as little as 15 to 30 minutes with good agitation of the mixture, i.e., sufficient agitation to maintain an effectively uniform dispersion of the scavenger throughout the latex-monomer solution. Often, however, it is desirable to maintain the scavenger dispersed in the solution for as much as 2 to 8 hours to accomplish effectively complete removal of the acid impurities.

The minimum amount of the scavenger that can be employed is determined by its capacity for the carboxylic acids and the total amount of the acids to be adsorbed. Preferably, the amount of scavenger material employed is sufficient to provide a total adsorptive capacity of at least about 2 and preferably 6 times the amount of carboxylic impurity to be removed from the solution. Since only the surfaces of the solid scavenger particles are available for reaction with the carboxylic acids, it is desirable, for the reason of efficiency, that scavenger particles be of a size as small as is conveniently filterable from the organic solution. Sizes from 10 to less than 200 standard mesh are satisfactory but not critical as larger or smaller particle sizes can be utilized.

Usually the latex-monomer solution contacted with the adsorbent is composed of the relative amounts of creamed rubber latex and vinyl aromatic monomer desired for preparation of the interpolymer molding composition, i.e., from about 1 to 25 percent by weight of the rubber latex and from about 75 to 99 percent by weight of the vinyl monomer. If desired, however, the creamed latex may be dissolved in less than the full amount of the vinyl monomer required for the interpolymer. In the latter case, enough of the monomer solvent is used to provide an easily stirred solution. For this purpose, at least about 2 parts of the monomer solvent are required for each part of the solute rubber. Exemplary vinyl aromatic monomers include those of the benzene series characterized by the formula:

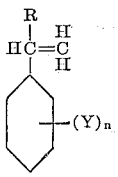

wherein R is of the group consisting of methyl and hydrogen, Y is of the group consisting of hydrogen, alkyls having from 1 to 4 carbons, chlorine and bromine and $n$ is an integer from 1 to 2, inclusive. Specific vinyl aromatic monomers are styrene, α-methylstyrene, ar-methylstyrene, ar-dimethylstyrene, ar-ethylstyrene, ar-isopropylstyrene, ar-tertiary butylstyrene, ar-chlorostyrene, ar-dichlorostyrene, ar-bromostyrene and the like.

The following examples illustrate the invention but it is to be understood that the invention is not limited thereto.

*Example 1*

A high impact molding composition of a styrene-rubber interpolymer was prepared by means of a mass reaction of 190 grams of styrene and 10 grams of a styrene butadiene rubber latex (GRS 1006 rubber). The reaction was conducted over a temperature range from about 110° to 220° C. The resulting polymer, which had a carboxylic acid content of 0.221 percent by weight, was then injection molded at a temperature of 225° C. to provide a wafer about ⅛ inch thick. This article exhibited numerous black specks and smears against an opaque white background, i.e., the normal color of the polymer.

In a second run, the rubber latex was dissolved in the styrene monomer and the resulting solution treated with 1 percent by weight based on the weight of the latex of an anion exchange resin for a period of 4 hours. The anion exchange resin used was a polymeric vinyl benzyl trimethyl ammonium hydroxide cross-linked with divinylbenzene sufficiently to provide water insolubility. This treatment reduced the organic carboxylic acid content from 0.221 percent to 0.009 percent. The rubber latex thus treated was utilized as above to prepare the high impact polystyrene molding composition. Upon injection molding this composition in a manner identical to that employed above, wafers were obtained having excellent clarity and complete freedom from the above described discolorations.

*Example 2*

In another operation similar to that of the foregoing operation, a similar rubber latex containing 0.22 percent organic acids to which had been added an additional 0.1 percent by weight of a fatty acid produced a molding composition which, upon being injection molded, provided extremely severe contamination, the surfaces of the molded article being substantially covered with black smears.

In a second run, the acid-containing rubber latex was dissolved in the styrene and treated with activated alumina by slurrying the latter together with the rubber-monomer solution. The alumina used was of a particle size that passed a screen of from 14 to 28 mesh. It had been activated by heating it at a temperature of 400° F. for 4 hours.

The styrene-rubber-alumina slurry was agitated for a period of about 8 hours. Thereafter, the alumina was removed by filtration and the purified styrene-rubber solution polymerized to prepare a high impact molding composition. Shaped articles produced from this molding composition exhibited complete freedom from black specks and smears.

In a manner similar to that of the foregoing, other rubber latexes which are prepared by the fatty acid soap promoted emulsion polymerization of butadiene, butadiene and acrylonitrile wherein at least 50 percent by weight of the monomer charge is butadiene and butadiene and styrene wherein at least 50 percent by weight of the monomer charge is butadiene, can be employed to prepare interpolymers that do not form local discoloration such as black specks and smears upon molding by contacting a solution of the rubber in a desired vinyl aromatic monomer with a carboxylic acid adsorbent or scavenger such as magnesium oxide, silica gel, relatively basic ion exchange resins and the like inert, solid acid scavengers insoluble in the rubber-monomer solution.

What is claimed is:

1. In a process for interpolymerizing vinyl aromatic monomers with an unsaturated, rubbery polymer containing at least 50 percent by weight of an aliphatic conjugated diolefin having from 4 to 6 carbons, said rubbery polymer having been prepared in a fatty acid soap-promoted emulsion polymerization system and thereafter acidified during recovery of the polymer from the polymerization system, which process comprises the steps of forming a solution of the rubbery polymer in a vinyl aromatic monomer and heating the resulting solution at a temperature within the range from about 50° up to about 240° C. for a period of time sufficient to achieve substantial conversion of the rubbery polymer and monomer to an interpolymerized product, said rubbery polymer being employed in an amount of from about 1 to about 25 percent by weight of the rubber-monomer solution, the improvement which consists in contacting the rubbery polymer-monomer solution prior to polymerization thereof with a solid, carboxylic acid scavenger material substantially free of iron, which scavenger material is insoluble in the solution and inert to the interpolymerization reaction, said scavenger being further characterized in that it forms salts of carboxylic acids in the solution whereby the carboxylic acid is removed from the solution to maintain the carboxylic acid content of the solution at less than 500 parts per million by weight of the solution.

2. A method as in claim 1 wherein the scavenger material is an anion exchange resin in the hydroxyl form.

3. A method as in claim 1 wherein the scavenger material is activated alumina.

4. A method as in claim 1 wherein the scavenger material is magnesium oxide.

5. In a process for interpolymerizing vinyl aromatic monomers with an unsaturated rubbery polymer containing at least 50 percent by weight of an aliphatic conjugated diolefin having from 4 to 6 carbons, said rubbery polymer having been prepared in a fatty acid soap-promoted emulsion polymerization system and thereafter acidified during recovery of the polymer from the polymerization system, which process comprises the steps of forming a solution of the rubbery polymer in a vinyl aromatic monomer and heating the resulting solution at a temperature within the range from about 50° up to about 240° C. for a period of time sufficient to achieve substantial conversion of the rubbery polymer and monomer to an interpolymerized product, said rubbery polymer being employed in an amount of from about 1 to about 25 percent by weight of the rubber-monomer solution, the improvement which consists in contacting the rubbery polymer-monomer solution prior to interpolymerization thereof with a solid, carboxylic acid scavenger material substantially free of iron, which scavenger material is insoluble in the solution and inert to the interpolymerization reaction, said scavenger being selected from the group consisting of anion exchange resins in the hydroxyl form and oxides and hydroxides of the metals in Groups I, II and III of the Periodic Table, whereby the carboxylic acid is removed from the solution to maintain the carboxylic acid content of the solution at less than about 500 parts per million by weight of the solution.

References Cited by the Examiner

UNITED STATES PATENTS

| | | | |
|---|---|---|---|
| 2,580,325 | 12/1951 | Scott et al | 260—29.6 |
| 2,820,773 | 1/1958 | Childers et al. | 260—880 |
| 2,862,907 | 12/1958 | Stein et al. | 260—880 |
| 3,022,260 | 2/1962 | Miller et al. | 260—29.7 |

SAMUEL H. BLECH, *Primary Examiner.*

WILLIAM H. SHORT, MURRAY TILLMAN,
*Examiners.*